(12) United States Patent
Laulom et al.

(10) Patent No.: US 6,776,315 B1
(45) Date of Patent: Aug. 17, 2004

(54) ICE CREAM AND SOFT DRINK MIXING CONTAINER/DISPENSER

(76) Inventors: Lawrence A. Laulom, 815 S. Mill St., Tehachapi, CA (US) 93561; Louis J. Laulom, 28025 Sarabande La. #1221, Santa Clarita, CA (US) 91380

(*) Notice: Subject to any disclaimer, the term of this patent is extended or adjusted under 35 U.S.C. 154(b) by 0 days.

(21) Appl. No.: 10/392,127

(22) Filed: Mar. 18, 2003

(51) Int. Cl.⁷ .................................. B65D 3/04
(52) U.S. Cl. ................... 222/568; 222/566; 222/142.1; 141/322; 215/DIG. 8
(58) Field of Search ........................... 222/142.1–142.3, 222/566–568; 141/319–322; 215/227, 228, DIG. 8

(56) References Cited

U.S. PATENT DOCUMENTS

| | | | |
|---|---|---|---|
| 2,975,925 A | * 3/1961 | Chambers | 215/387 |
| 3,163,332 A | 12/1964 | Boyle | 222/180 |
| 3,434,636 A | * 3/1969 | Kachman | 222/567 |
| 3,945,617 A | 3/1976 | Callery | 259/54 |
| 4,971,211 A | 11/1990 | Lake | 215/6 |
| 5,085,330 A | * 2/1992 | Paulin | 215/6 |
| 5,312,014 A | * 5/1994 | Hamlin | 220/703 |
| 5,607,072 A | 3/1997 | Rignev et al. | 215/10 |
| 6,085,919 A | 7/2000 | Singer | 215/10 |
| 6,209,737 B1 | * 4/2001 | Bliss | 215/228 |

OTHER PUBLICATIONS

Author, Not Known. Title: Astro Float, Date:Early 1950's Produced in U.S.A. we think, Not published.

* cited by examiner

Primary Examiner—J. Casimer Jacyna

(57) ABSTRACT

An attachment for a beverage container allows for the mixing of ice cream and carbonated drinks to be consumed by an individual. Ice cream is placed in a hollow attached to a beverage container with a valve. The unit is inverted and the valve is opened to allow the carbonated drink to mix with the ice cream in the hollow container producing a float like beverage.

11 Claims, 9 Drawing Sheets

ICE CREAM AND SOFT DRINK MIXING CONTAINER/DISPENSER

FEDERALLY SPONSORED RESEARCH

Not Applicable

BACKGROUND

1. Field of Invention

The present invention relates to food and beverage containers. More particularly, the present invention relates to the mechanism to which ice cream and soft drink beverages are mixed together, dispensed, and then consumed by an individual.

2. Description of Prior Art

Fast food, grocery and liquor stores sell soft drinks and ice cream. To combine these ingredients produces a delightfully tasting beverage. In the past the only way a person or persons could achieve the food/drink combination, would be to mix these ingredients together in a glass or bowl. This invention will allow the user the means in which to mix a float type drink without the mess of spillage and the inconvenience of preparation. Also, drink will be mixed in a convenient, sealed container to be consumed at the user's discretion.

In U.S. Pat. No. 5,607,072, titled Beverage Containers, invented by Patrick Rigney and Colin Purdy, a liquid container with two compartments attached to one another. Both with a different volume of containment. This ratio of volume is most preferably set at 2:1 per claim 4. Said invention also is adapted to receive cork stoppers. In yet another feature of patented invention, neck portions of bottles are adapted to be sealed by screw type closures.

The patented invention differs from the present invention because the patented invention is limited to what it can do. Patented invention can mix two beverages together as they exit bottles. Present invention can mix a food product and a carbonated beverage together inside itself, to be dispensed at user's discretion. Present invention can deal with pressure that the mixing of ice cream and a soft drink beverage can produce. Patented invention must mix ingredients outside of its containers, in a glass or bowl. Present invention is mixed and consumed all in one self contained unit. Patented invention cannot be attached to another beverage container. Present invention can be threaded atop most commercially available soft drink bottles.

In U.S. Pat. No. 6,085,919, titled, Bottle Cap With Prize, invented by Uri Singer, a prize compartment threads onto a bottle. Nothing else seems to be relevant to present invention.

In U.S. Pat. No. 4,971,211, titled Dual Chambered Baby Bottle invented by Marie L. Laki, which also has two compartments attached to each other as in U.S. Pat. No. 5,607,072. The patented invention differs from the present invention in that it is designed for babies. Present invention is designed for kids and adults. Patented invention also does not mix a food and a liquid together to be dispensed. Present invention has a single chamber for the mixing of a beverage and a food product. Patented invention does not.

In U.S. Pat. No. 3,945,617, titled Mixing Method and leans, invented by Thomas R. Callery, a mixing method that uses two, end to end, pre-packaged vials. Though patented invention does not mention food or beverage mixing, food being a solid, I will show that patented invention does not have some of present inventions feature and/or advantages. Patented invention cannot meter precise amounts of liquid, present invention does. Patented invention needs two pre-packaged vials with precise amounts of liquid in each one. Present invention can use any amount of liquid and solid, up to chamber capacity, and still function. Patented invention must be shaken to function properly. Present invention mixes simply by tipping up and engaging a lever, physics does the rest.

In U.S. Pat. No. 3,163,332, titled Liquid Dispenser, invented by Milford J. Boyle, a simple liquid dispensing method that attaches to a patients bed railing in a hospital. Liquid is consumed via a long tube or straw attachment. Strata is attached to a plastic bottle, that is attached to bed railing. Patented invention dispenses only liquid, present invention mixes both a liquid and a food product (ice cream) which is then dispensed. Patented invention cannot meter liquid, present invention can. Patented invention, because of straw location, cannot dispense liquid when said bottle in tipped up, Present invention can. Patented invention cannot thread atop a beverage bottle, present invention can. In U.S. Pat. No. 5,045,631, titled Premium Dispensing container, invented by Gene W. Goodman. Container which appears to be a conventional aluminum beverage container that dispenses both a beverage and a premium, such as a capsule containing money or other prizes. The only similarity between patented invention and present invention seems to be the dispensement of a beverage. Patented invention does not mix any ingredients as does present invention. Lastly, patented invention has to use a conventional type aluminum container, present invention threads atop a standard soft drink bottle.

OBJECTS AND ADVANTAGES

Present invention will allow the user of this product, a new and novel way to mix and dispense a soft drink beverage into an ice cream filled compartment, producing a float like beverage that can then be consumed at users discretion. Another new and novel advantage of said invention is that it is both compact and reuseable, Besides producing a superior tasting drink, present invention will offer take anywhere, non-spill, one handed operation. Yet another advantage of said invention will be convenience. Lastly, said invention can be separated from beverage bottle and stored, with ice cream, in users freezer, to be reused at a later time. We feel, there is nothing on the market at this time, for this type of product, that offers all the features, novelty and usefulness as present invention.

SUMMARY

The present invention consists of a spherical elliptical or oval shaped container, either transparent or opaque in color, attachments 28 and 34. Diameter can vary. This container can be separated at center line, via cam pin lock, FIGS. 6 and 7 for insertion of ice cream or other food products. Container, or ice cream chamber is permanently attached atop a cylindrical shaped flapper type metering valve FIGS. 4 and 5. Said valve is manually operated by a lever wheel actuator 24 that actuates a spring flapper 52 that opens and closes in operation. Said valve is attached to side of valve housing 50. This valve with its bottom attachment is capable of threading onto most standard soft drink bottles 20. when bottle is tipped in a semi inverted position and wheel lever is engaged, flapper is opened, allowing beverage to enter ice cream chamber, mixing with same. Attached to top of ice cream chamber is a drink tube 40. This attachment allows beverage to flow from chamber to users mouth. Attachment 42 is a drink tube cap. Said cap allows present invention to be tipped up, without loss of beverage. Said can 42 is removeable.

REFERENCE NUMERALS IN DRAWINGS

| 20 | bottom threadable cap | 22 | pressure metering valve |
|----|----|----|----|
| 24 | wheel lever actuator | 26 | ice cream chamber flange |
| 32A | bottom chamber screen | 30 | bottom ice cream chamber |
| 32 | top chamber screen | 34 | top ice cream chamber |
| 36 | bottom reinforcement band | 38 | top reinforcement band |
| 40 | drink tube | 42 | drink tube cap |
| 44 | flapper spring | 46 | flapper shaft |
| 48 | spring cover cap | 50 | pressure valve housing |
| 50A | 30 degree angle cut | 52 | flapper |
| 54 | thumb lever screw | 56 | male cam pin |
| 58 | female cam hold down | 60 | wall thickness |
| 62 | bottle mating surface | 64 | center opening |
| 66 | female band caps | | |

DETAILED DESCRIPTION OF DRAWINGS

Figure 1:
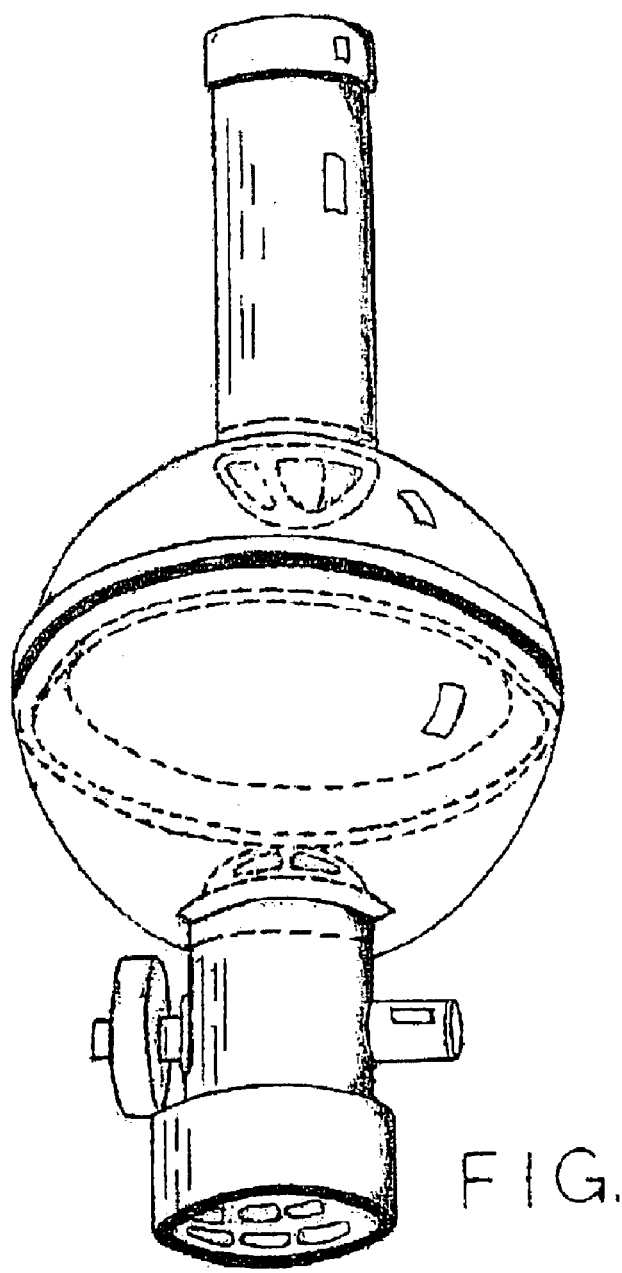
FIG. 1. Is an isometric view of complete said invention shown with partial view of commerical soft drink bottle.
Figure 1:
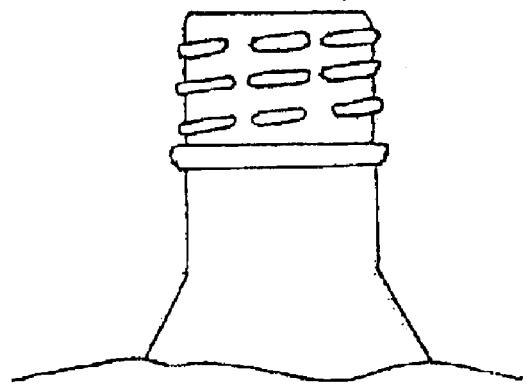
Figure 2:
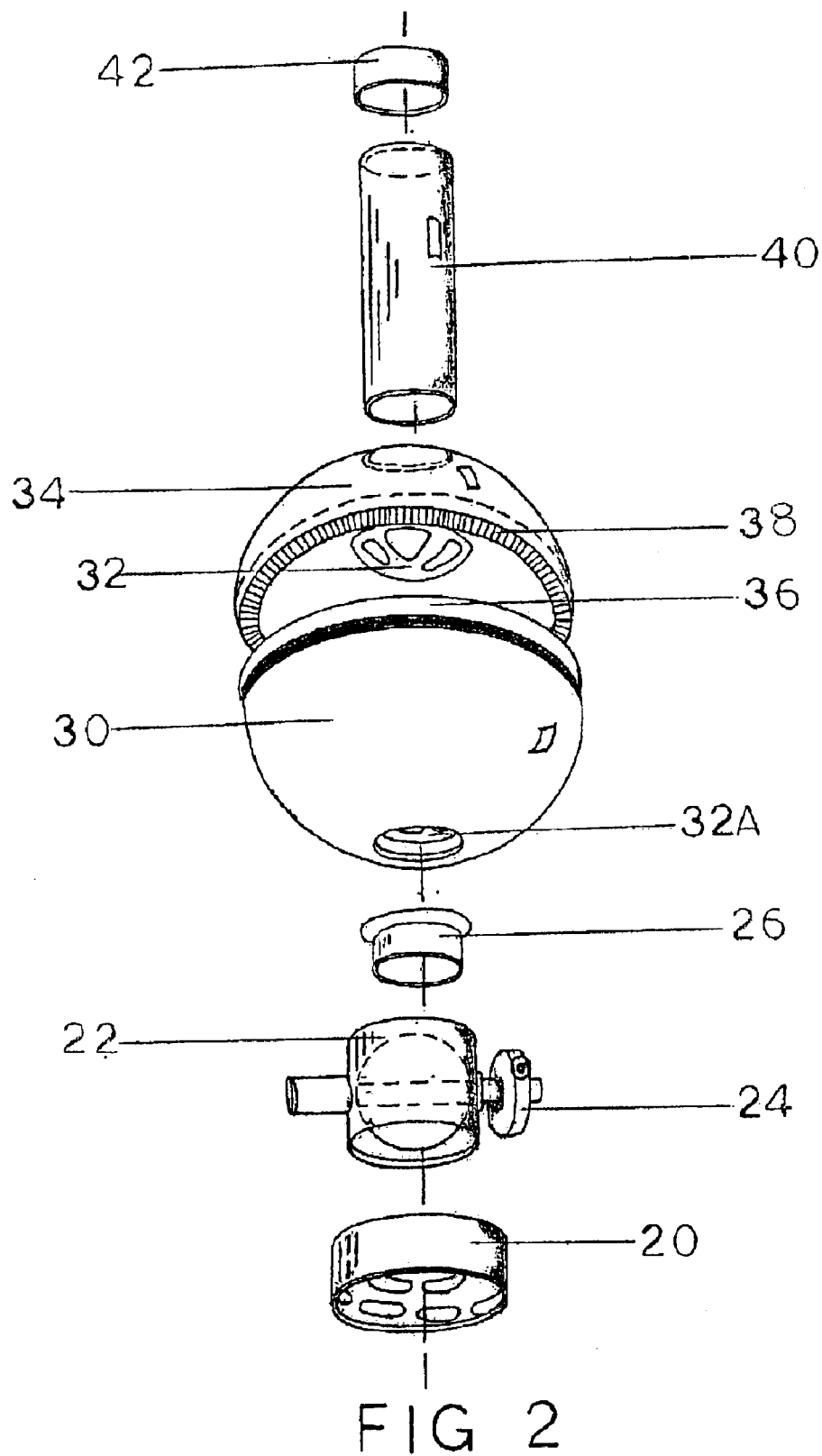
FIG. 2. Exploded isometric view of complete said invention.
Figure 5:
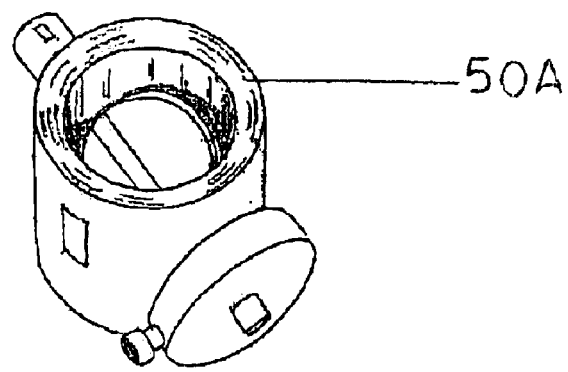
FIG. 5. Isometric side view of pressure metering valve.
Figure 4:
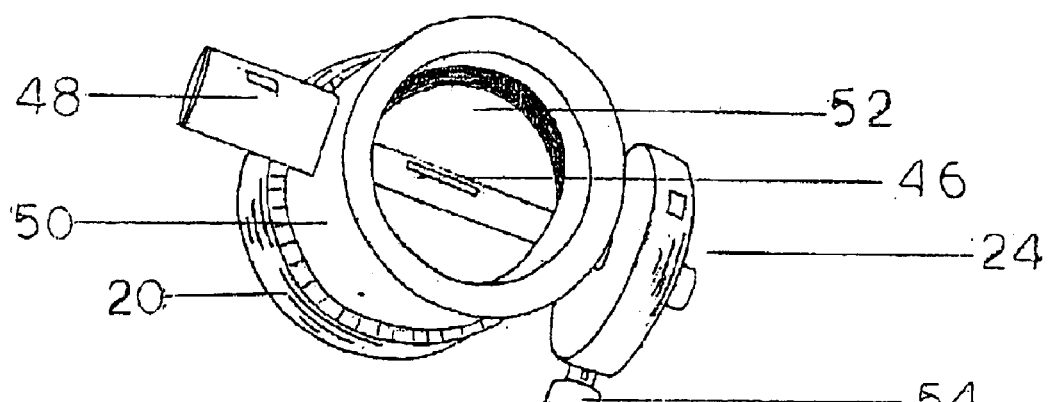
FIG. 4. Isometric top view of pressure metering valve.
Figure 3:
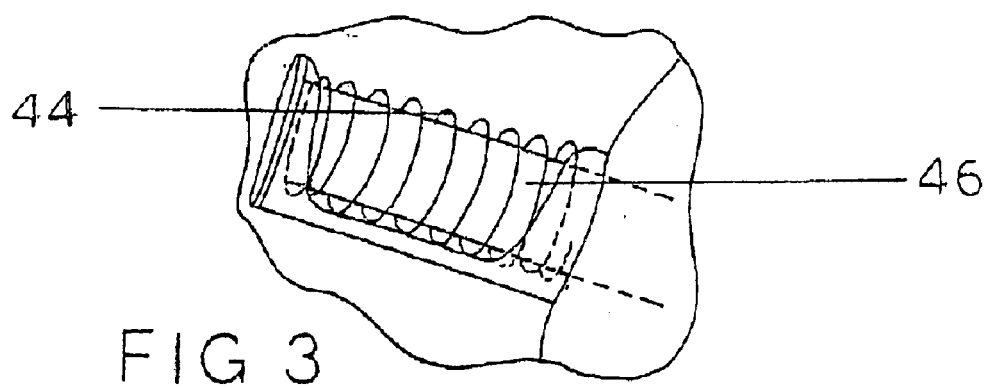
FIG. 3. Cut-away view of spring return mechanism located in pressure metering valve.
Figure 7:
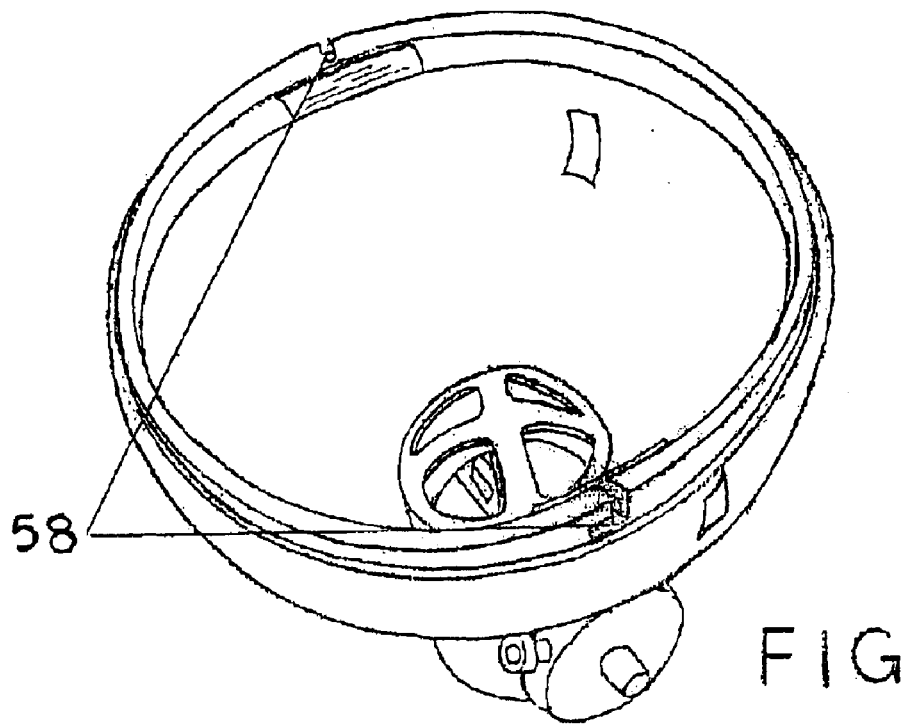
FIG. 7. Isometric view of bottom half of ice cream chamber, and pressure metering valve, wheel lever actuator and bottom ice cream screen.
Figure 6:
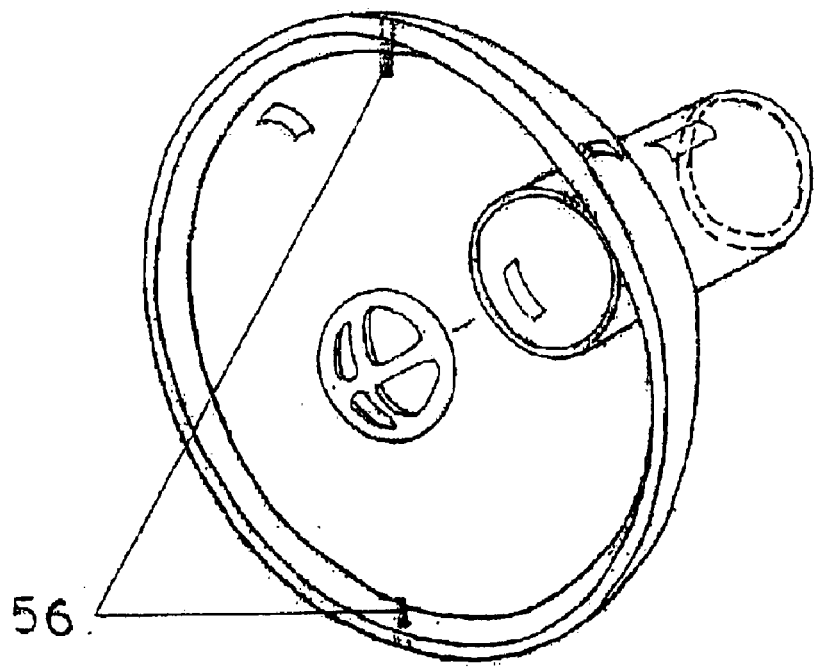
FIG. 6. Isometric view of top half of ice cream chamber FIG. 5 also shows top drink tube, ice cream screen and male hold down pins.
Figure 9:
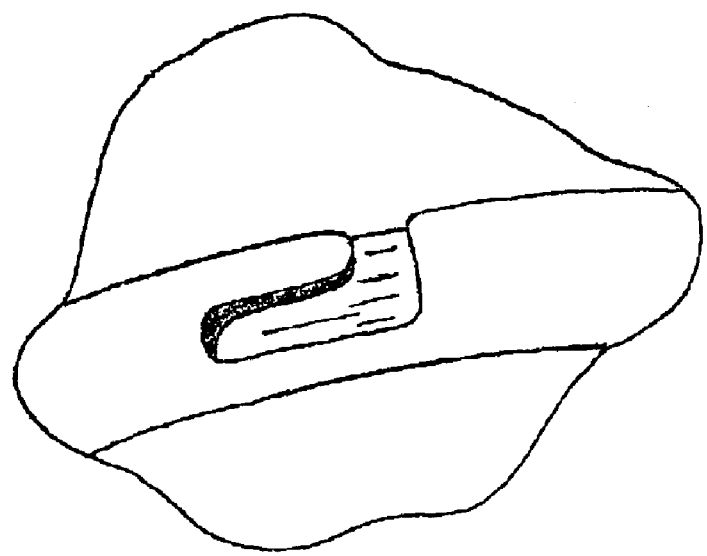
FIG. 9. Shows enlarged view of FIG. 7.
Figure 8:
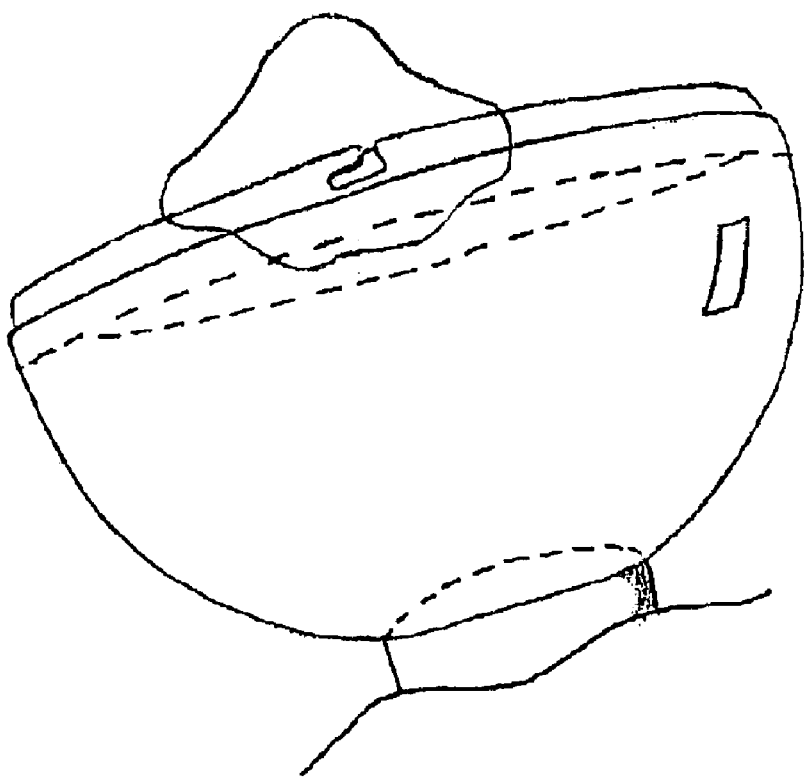
FIG. 8. Side view of bottom half of ice cream chamber, showing female cam hold down.
Figure 12:
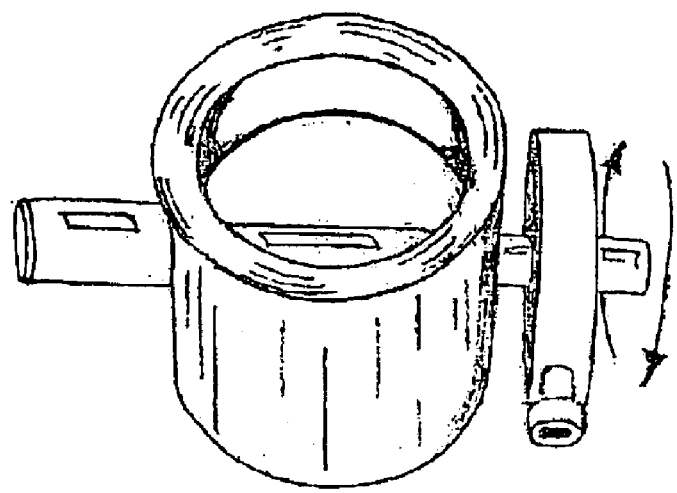
FIG. 12. Shows isometric,view of pressure metering valve.
Figure 11:
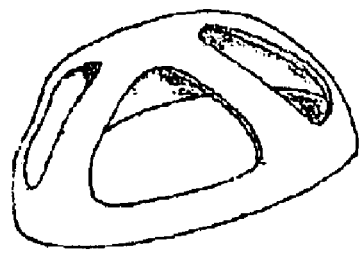
FIG. 11. Shows isometric view of ice cream chamber screen.
Figure 10:
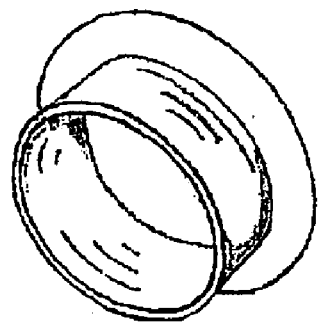
FIG. 10, Isometric view of bottom ice cream chamber flange.
Figure 14:
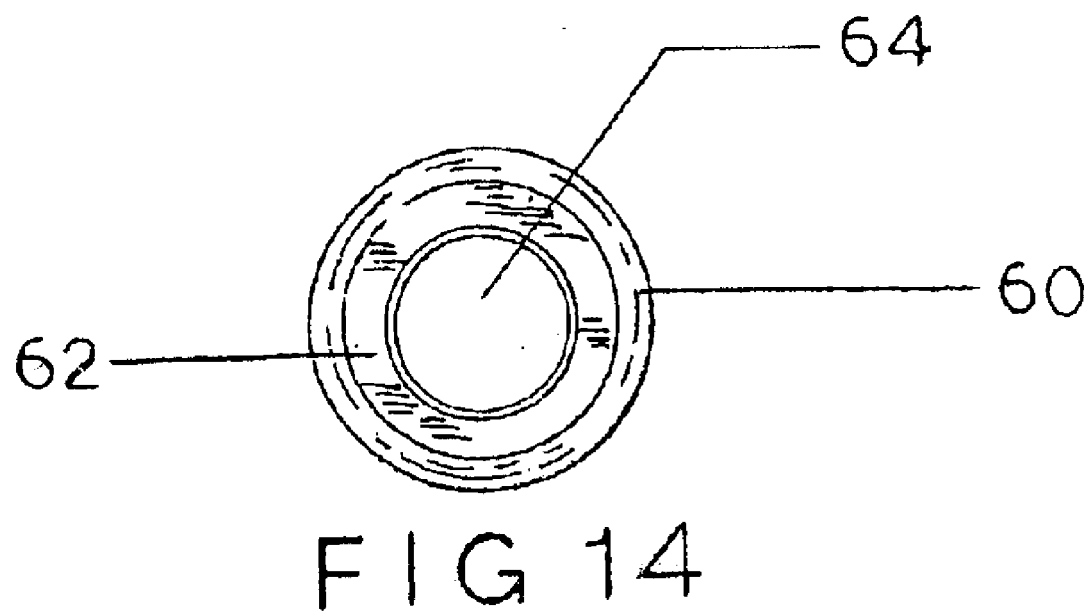
FIG. 14. Shows a bottom view of FIG. 12.
Figure 13:
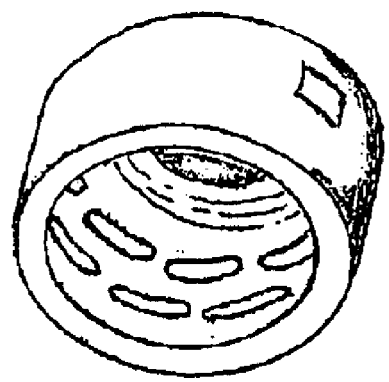
FIG. 13. Isometric view of threadable type cap.
Figure 15:
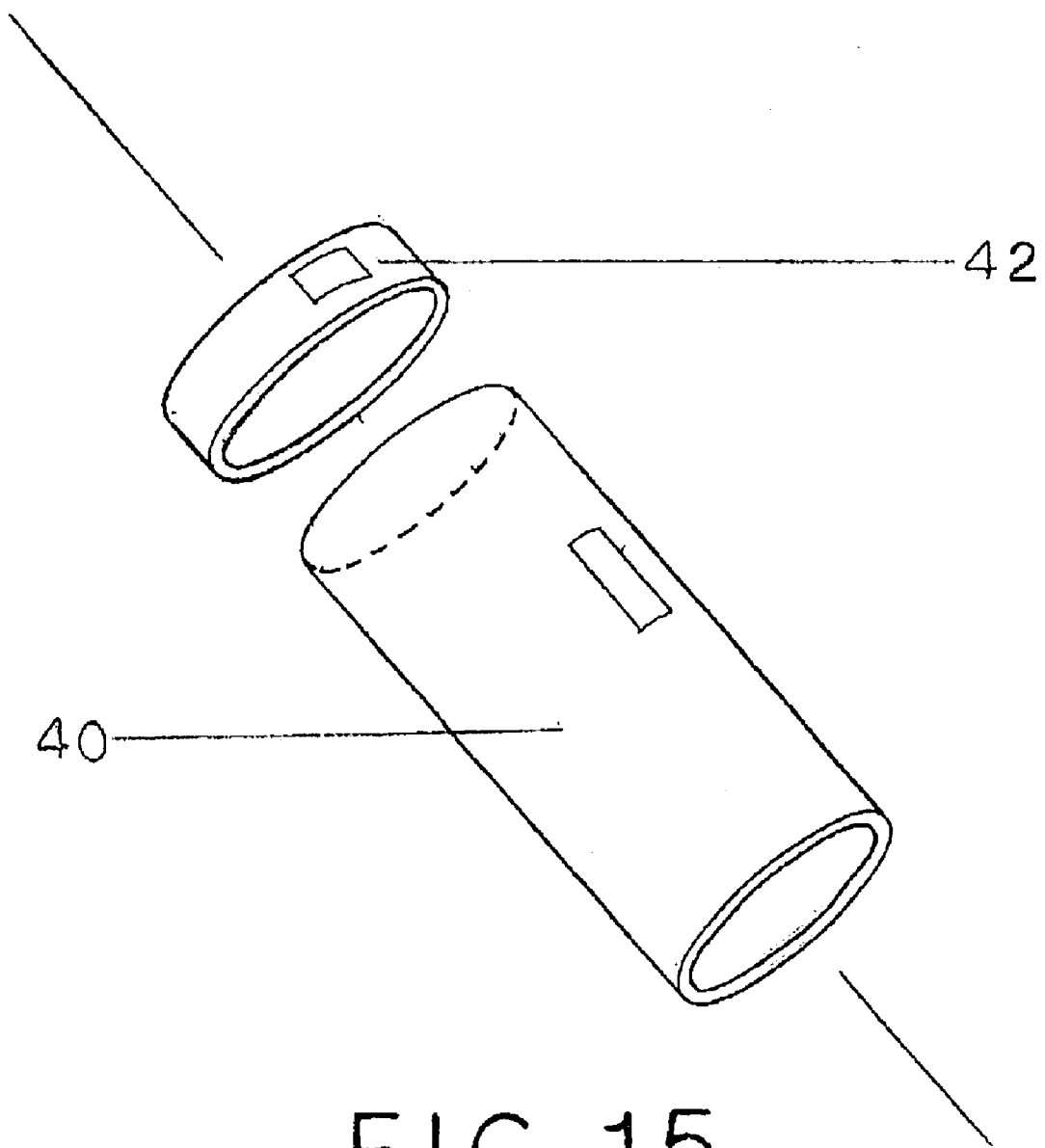
FIG. 15. Top drink tube with corresponding drink tube cap.
Figure 17:
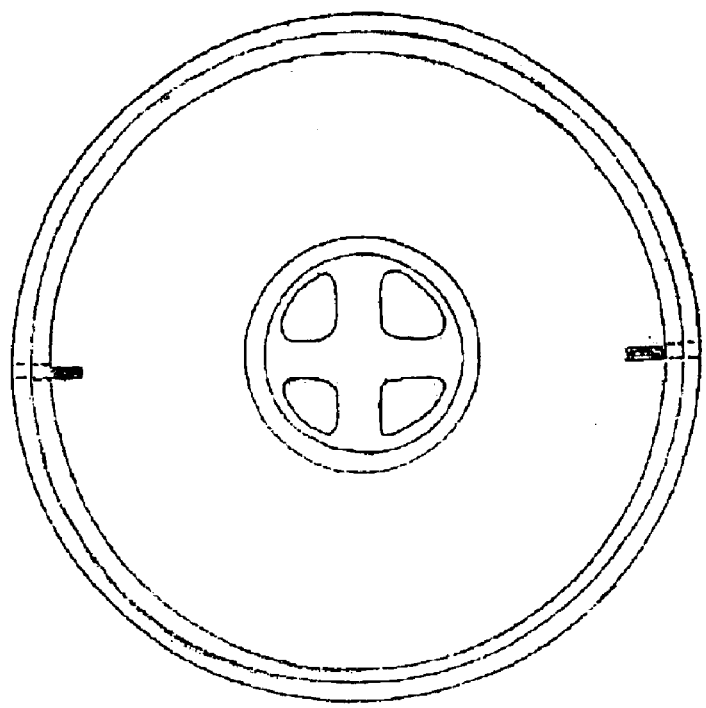
FIG. 17. Shows a bottom view of too of ice cream chamber.
Figure 16:
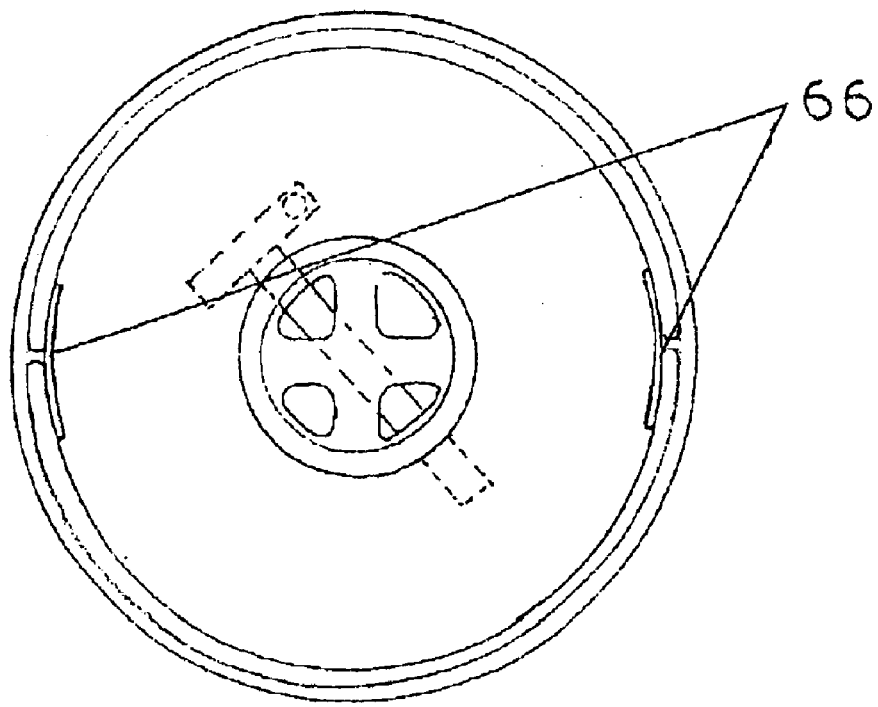
FIG. 16. Is a top view of bottom of ice cream chamber.

Reference to FIG. 1, which shows the completed said invention, ready to be threaded atop a filled commerically available soft drink beverage bottle. Ice cream in chamber omitted for drawing clarity. Overall length of said invention is approx. 180 milimeters. In FIG. 2, and exploded view of said invention shows twelve basic parts of said invention. Starting with attachment 20 which depicts bottom threadable cap, which is permanently attached to bottom of pressure metering valve 22. FIG. 2 shows pressure metering valve 22. Said valve is a metering device that controls amount of beverage that originates from soft drink bottle. Attachment 24 depicts wheel lever actuator. This attachment, when turned in a counter-clock wise direction, opens a spring loaded flapper type valve 52 that in turn allows a liquid beverage to flow, in a metered amount, into ice cream chamber 30. In FIG. 2 shows lower ice cream chamber flange 26 which acts as a type of filter between lower ice cream chamber 30 and pressure metering valve 22. Attachments 20 22 and 26 are cylindrical in shape. They are made of either, polyurthane, metal, plastic or a composite type material. Attachments 20 22 26 and 30 are all permanently attached to each other, creating one unit. In FIG. 2 bottom half of ice cream chamber 30 is shown. When attached to upper half of ice cream chamber 24 bottom chamber 30 is spherical in shape. Attachment 32A (two in number) are the bottom and top ice cream screens that are permanently attached to inside bottom and top ice cream chamber halfs. Their function is two-fold. Bottom screen helps to keep ice cream from entering pressure metering valve. Top screen allows beverage to pass into drink tube 40 without impediment of ice cream when said invention is in drinking position. Bottom screen 32A also helps to keep ice cream drippings from entering beverage bottle, thus curbing excessive pressure buildup in same. Reinforcement band 36 is shown permanently bonded to top, outer diameter of attachment 30. In FIG. 2 top half of ice cream chamber 24 which when attached to 30 completes spherical ice cream chamber. Chamber attachment mechanism is explained in later diagrams. Inner reinforcement band 38 which is permanently attached to inner, bottom wall of 24 gives both chamber halfs added strength. FIG. 2 depicts drink tube 40 which is permanently bonded to top of upper ice cream chambers 34. Center hole in upper ice cream chamber is location of drink tube bonding. Drink tube 40 is cylindrical in shape and is approx. 57 milimeters in length. Said tube has an outside diameter of approx. 25 milimeters. Attachments 30 34 and 40 to be either transparent or opaque in color, depending on materials used for construction. Drink tube cap 42 is a snug fitting, removeable attachment. Drink tube cap 42 fits atop drink tube 40. Said cap is approx. 20 milimeters long, with a wall thickness of approx. 1.5 milimeters. Outside diameter is approx. 27 milimeters. FIG. 3 is a cutaway, exploded view of pressure metering valve return spring 44 and pressure metering valve flapper shaft 46. Spring is pinned at both ends on flapper shaft 47 and has a counter clock-wise operation. Both shaft and spring are housed in a tube cover 48 that is capped off and sealed at end of tube, this keeps spring and shaft corrosion free. Said spring is approx. 8 milimeters long with a diameter of approx. 5 milimeters. FIG. 4 shows isometric view of pressure metering valve 22 and bottom threadable cap attachment 20 as a complete unit. Pressure metering valve housing 50 is cylindrical in shape, with a wall thickness of approx. 2.5 milimeters. Approx. height, without attachment 20 is approx. 26 milimeters with an outside diameter of approx. 27 milimeters. Return spring cover cap 48 shown in FIG. 4 is located approx. half way up side of pressure metering valve housing 50 and is permanently attached to same. Said cap 48 is approx. 7 milimeters in diameter with a length of approx. 12 milimeters and a wall thickness of approx. 1 milimeter. FIG. 4 depicts pressure metering valve flapper 52. Said flapper is round in shape and is approx. 1 milimeter thick and has a diameter of approx. 24.5 milimeters. Flapper 52 in open position allows soft drink beverage to exit bottle and enter ice cream chamber. In closed position, flapper seals ice cream drippings in chamber, keeping them from entering beverage bottle and causing excessive pressure buildup. Flapper 52 can be proportionally opened and closed to allow desired amount of beverage to enter ice cream chamber. Flapper 52 is permanently attached to flapper shaft 46. Flapper shaft 46 is moveably mounted through center line of pressure metering valve housing 50. Center line of flapper shaft is slotted for permenent attachment of flapper 52. FIG. 4 shows wheel lever actuator 24 which is mounted to flapper shaft 46 which protrudes approx. 12 milimeters outside of flapper housing 50. Wheel lever actuator 24 is approx. 21 milimeters in diameter and is approx. 4 milimeters thick. Said actuator is mounted to flapper shaft 45 through center hole in 24. Center opening is approx. 4.5 milimeters in diameter. Wheel lever actuator 24 is operated by engaging thumb lever screw 54 which is located on outside diameter of actuator 24. FIG. 5 shows an approx. 30 degree angle cut 50A into top of Pressure metering valve housing 50 which allows flush attachment of lower ice cream chamber. FIG. 6, depicts upper portion of ice cream chamber with its bottom counterpart, FIG. 7. A view in FIG. 6 shows male cam pin 56 hold down. Cam pins 56 are permanently attached to inner reinforcement band 38 inside ice cream chamber. Cam pin diameter is approx. 1 milimeter with a protruding length of approx. 3 milimeters. Top portion of ice cream chamber 34 is coined atop bottom half of ice cream chamber 30 by mating male 57 and female 58 cam pin mechanism. A slight counterclockwise twist will secure chamber. FIGS. 6 and 7 also depict two isometric views that are separated at center, of complete ice cream chamber. Attachments also shown include, ice cream screens 32 and 32A. Also shown are drink tube 40 partial view of pressure metering valve 22 flapper 52 and shaft 46. FIGS. 8 and 9 shows another angle of female cam 58 hold down. FIG. 9 depicts a cutaway blowup view of female cam 58 hold down. FIG. 10 is an isometric view of lower ice cream chamber flange 20. Flange has a wall thickness of approx. 1.5 milimeters, and an overall length of approx. 19 milimeters. Flange FIG. 10 has a center opening of approx. 17.5 milimeters. Said flange has a 30 degree top lip that matches mating surface of bottom inside lower ice cream chamber 30. Lower ice cream flange is permanently attached to and connects both the pressure metering valve 22 and the bottom half of ice cream chamber 30 together. FIG. 11 is an isometric view of ice cream chamber screen 32 32A. Both top and bottom screens are identical in size and shape. Said attachment has a diameter of approx. 25 milimeters, a wall thickness of approx. 0.5 milimeters and a height of approx. 11 milimeters. Both upper and lower ice cream chamber screens act as filters and/or buffers against bulk of ice cream scoop at top and bottom chamber openings. They both allow beverage to pass through the pressure metering valve 22 and drink tube 40 without impediment. FIG. 12 depicts isometric view of pressure metering valve 22 with proper operational direction of wheel lever actuator 24 (arrows). Since flapper 52 is spring loaded, the release of wheel lever actuator 24 will always return flapper to closed position. FIG. 13 shows isometric view of threadable lower attachment 20 before mating to Pressure metering valve 22, Female threads of this attachment to fit most commercially available soft drink bottles. FIG. 14 shows a bottom view of FIG. 13. Wall thickness 60 is 3 milimeters. Bottle mating surface 62 with a 0.25 milimeter coating for pressure and leak proof operation, has a diameter of approx. 4 milimeters. Center opening 64 has an inside diameter of approx. 17 milimeters. Overall length when threadable cap 20 is mated to pressure metering valve 22 is approx. 42 milimeters. FIG. 15 shows drink tube 40 with associated drink tube can 42. Refer to FIG. 2 for tube and can dimensions. FIG. 16 shows top inside view of bottom half ice cream chamber 30. Female cam band cans 66 can also be observed in FIGS. 7 and 9. Caps seal off openings of female cam 58 hold down inside bottom ice cream chamber 30 which prevents leakage of beverage from ice cream chamber. FIG. 17 shows inside bottom view of top half of ice cream chamber 32 with associated cam pins 56 and upper ice cream screen 32A.

The structure just described not only provides advantages of convenience and operational reliability, but also allows an option of decorative design to outside of attachments 22 30 34 40 and 42. Materials selected for construction of preceding illustrated attachments should be considered for compatibility when using soft drink and ice cream products.

While present invention has been described and illustrated with respect to a container/dispenser, intended for use with soft drink and ice cream products, it will become apparent to those skilled in the art, that present invention can be used to dispense other flowable products, either consumable or not. This includes powders, chemicals, or other food products. Also, it is understood that while present invention, shows a flapper type dispensing valve, activated by a wheel lever, another type of dispensing mechanism may be employed, such as a slide valve, or spring ball type valve mechansim. It is further understood that because of excessive pressure from carbonation, shaft 46 may or may not have "O" ring attachments to outer diameter, where shaft 46 is mated to pressure housing 50, depending on mating surface tolerances.

Operation

To operate present invention remove cap on standard soft drink bottle. Remove top half of ice cream container 34 by holding 30 with one hand while turning said attachment 34 slightly counterclockwise. This will disengage steel pinned cam lock mechanism, FIGS. 6 and 7. Remove top portion of chamber. Insert scoop of ice cream into bottom of chamber 34. Reattach chamber halfs by reversing above procedure. Said invention can now be threaded atop soft drink bottle and the mixing and consumption of ingredients can now take place. With drink tube can 42 in place, tip bottle to a 45 degree, or semi inverted position, at this time engage spring loaded valve by actuating wheel lever 24 on pressure metering valve 22. This will allow soft drink beverage to enter ice cream chamber, mixing with ice cream. At first, only small amount of beverage should be allowed into chamber. This will keep excessive amounts of pressure from building up in ice cream chamber. Thumb lever screw 54 should always be released before setting bottle down, as to not allow any ice cream to enter beverage bottle. Drink tube cat 42 is now removed and mixed ingredients can now be consumed through drink tube 40. Said invention can also be operated without drink tube cap 42 in place. This can be done by tipping said invention to users mouth, at same time actuating wheel lever, allowing a small amount of beverage to enter ice cream chamber, mixing with ice cream which in turn then flows through drink tube, and into user's mouth. After all contents of bottle and chamber are consumed, said invention can be unscrewed from bottle, separated at center line of ice cream chamber, washed in dish water, and put away for future use. In the event that some ice cream is left over in chamber, said invention can be separated from bottle and stored in freezer for future consumption.

We claim:

1. A metering and dispensing container for fluids and ice cream comprising:
   a bottom attachment having a threadable inner wall and a smooth outer wall with an opening in center;
   a bottom neck attachment, cylindrical or elliptical in shape with a spring loaded flapper valve in center opening;

a two piece center attachment having an inner wall an outer wall and central openings at both top and bottom;

said center attachment that when placed together forms a hollow container, spherical, elliptical, or oval in shape;

a two piece screen attachment that is permanently attached to inside top and inside bottom of center attachment;

a top drink tube attachment that attaches to the top center attachment;

a removeable top cap attachment that attaches to the top of drink tube.

2. A metering and dispensing container as in claim 1, wherein said attachments are manufactured from materials comprising either, or in conjunction with, plastic, nylon, polyurthane, metal, glass, or space age composite.

3. A metering and dispensing container as in claim 1, wherein said bottom attachment will have the abliity to thread onto and detach from most standard soft drink bottles.

4. A metering and dispensing container as in claim 1, wherein said bottom neck attachment is capable of dispensing a metered amount of beverage into center attachment.

5. A metering and dispensing container as in claim 1, wherein said bottom neck wherein said attachment will be manually operated via a wheel lever.

6. A metering and dispensing container as in claim 1, wherein said bottom neck attachment, will incorporate a spring loaded flapper valve located in center housing of bottom neck attachment, wherein when engaged in open position will allow beverage to flow into center attachment, and when disengaged, will stop flow of beverage from soft drink bottle.

7. A metering and dispensing container as in claim 1, wherein said bottom attachment and said bottom neck attachment are permanently attached to one another making one attachment.

8. A metering and dispensing container as in claim 1, wherein said bottom attachment and said bottom neck attachment are pressure and leak resistant.

9. A metering and dispensing container as in claim 1, wherein said two piece center attachment is held together by cam pins in top half of center piece that will interlock onto corresponding female slots of bottom half attachment.

10. A metering and dispensing container as in claim 1, wherein said two piece screen attachment, will allow metered amount of beverage to flow both into center attachment and top drink tube attachment, unimpeded by ice cream.

11. An attachment adapted for use with a beverage container comprising:

a hollow top half with a drink tube and cap attachment;

a hollow bottom half, removably connected to said top half; and a spring loaded valve connected to said bottom half, said valve including threads adapted for connecting to a beverage container.

* * * * *